(12) United States Patent
Ito et al.

(10) Patent No.: US 7,835,123 B2
(45) Date of Patent: Nov. 16, 2010

(54) ELECTRICAL AND ELECTRONIC SYSTEM

(75) Inventors: Masahiko Ito, Anjo (JP); Shouichi Okuda, Nukata-gun (JP)

(73) Assignee: Denso Corporation, Kariya (JP)

( * ) Notice: Subject to any disclaimer, the term of this patent is extended or adjusted under 35 U.S.C. 154(b) by 589 days.

(21) Appl. No.: 11/985,308

(22) Filed: Nov. 14, 2007

(65) Prior Publication Data
US 2008/0143180 A1 Jun. 19, 2008

(30) Foreign Application Priority Data
Dec. 19, 2006 (JP) ............................. 2006-341450

(51) Int. Cl.
*H02H 9/00* (2006.01)
(52) U.S. Cl. ........................................................ 361/56
(58) Field of Classification Search .................... 361/56
See application file for complete search history.

(56) References Cited

U.S. PATENT DOCUMENTS

| | | | |
|---|---|---|---|
| 4,595,865 A * | 6/1986 | Jahns .................... | 318/400.06 |
| 6,465,907 B2 | 10/2002 | Ueno et al. | |
| 7,532,010 B2 * | 5/2009 | Kamel et al. ................ | 324/503 |
| 2005/0052222 A1 * | 3/2005 | Ootani et al. ............... | 327/536 |
| 2005/0200203 A1 | 9/2005 | Uono et al. | |
| 2008/0074117 A1 * | 3/2008 | Kamel et al. ................ | 324/503 |
| 2010/0165668 A1 * | 7/2010 | Lin .......................... | 363/21.02 |

FOREIGN PATENT DOCUMENTS

| | | |
|---|---|---|
| JP | 03-049524 | 3/1991 |
| JP | 06-245373 | 9/1994 |
| JP | 09-199666 | 7/1997 |
| JP | 2000-184589 | 6/2000 |

* cited by examiner

*Primary Examiner*—Ronald W Leja
(74) *Attorney, Agent, or Firm*—Harness, Dickey & Pierce, PLC

(57) ABSTRACT

An electrical and electronic system includes an air-bag ECU and a squib. The air-bag ECU has a power supply circuit, an electronic element, a noise protection line, a switching element and a voltage detector. The noise protection line is connected between an element line, which is connected to the electronic element and the squib and to the ground. The switching element is connected to the noise protection line in series. When the voltage detector detects a large noise, it turns on the switching element to protect the electronic element from such a large noise.

20 Claims, 4 Drawing Sheets

ELECTRICAL AND ELECTRONIC SYSTEM

CROSS REFERENCE TO RELATED APPLICATION

This application is based on and incorporates herein by reference Japanese Patent Application No. 2006-341450 filed on Dec. 19, 2006.

FIELD OF THE INVENTION

The present invention relates to an electrical and electronic system, in which electrical equipment disposed at the outside of an electronic control unit is connected to internal electronic circuits of the ECU.

BACKGROUND OF THE INVENTION

An electronic control unit (ECU) is configured so that various electronic elements are arranged on a printed-wiring board. The electronic element is an electronic part utilizing conduction of electrons. The ECU and electrical equipment disposed at the outside of the ECU and connected to the ECU form an electrical and electronic system.

In the electrical and electronic system, the electrical equipment is disposed at the outside of the ECU, and thus electro static discharge (ESD) such as high-voltage static charge or the like may enter from the external side to the electrical equipment. In this case, the electronic elements in the ECU may be broken by the high-voltage ESD. Therefore, various countermeasures to protect the electronic elements have been implemented to the electrical and electronic system.

For example, as disclosed in JP-A-3-49524, a capacitor conducted to the ground (GND) is connected to a line through which the outside and inside of the ECU are connected to each other. In this case, ESD entering from the external side can be made to leak through the capacitor to the ground. Accordingly, the electrical elements in the ECU are protected from high-voltage ESD.

In the electrical and electronic system, the electrical equipment is connected to a power supply circuit and the ground, and a high side circuit or a low side circuit are provided. In the high side circuit, electrical elements are arranged between the power supply circuit and the electrical equipment. In the low side circuit, electronic elements are arranged between the electrical equipment and the ground. Furthermore, the electrical and electronic system may have both the high side circuit and the low side circuit.

For example, in the case of an air-bag ECU for a vehicle, transistors are arranged in the high side circuit and the low side circuit. The control of electrical equipment (squib) for activating or inflating an air-bag is performed by controlling ON/OFF operations of the transistors, as disclosed in U.S. Pat. No. 6,465,907 (JP 2001-239916A). In this case, as shown in FIG. 4, capacitors 102 are provided between the electrical equipment 101 and both of the high side circuit and the low side circuit, respectively. Thus, both transistors 103 in the high side circuit and the low side circuit are protected.

Furthermore, one zener diode may be connected to a squib in parallel, and two zener diodes whose anodes are connected to the ground are provided to both of a high side circuit and a low side circuit in an air bag ECU, whereby transistors are protected from ESD. In this case, three zener diodes are used for one electrical equipment.

It is usual that plural kinds of electrical equipment are connected to the electrical and electronic system. For example, when activation of plural air-bags is controlled in the air-bag ECU, the electrical and electronic system has plural squibs, and high and low side circuits whose numbers correspond to the number of squibs are provided in the ECU.

Here, it is assumed that electronic elements are protected from ESD by using a capacitor. In this case, ESD flows through the capacitor to the ground at all times, and thus the capacitor is liable to be deteriorated. In connection with the deterioration of the capacitor, the insulating resistance value of the capacitor is lowered, so that the voltage of an electrical line 104 in FIG. 4 for connecting the electrical equipment and the electronic elements may vary and become unstable. Particularly when the electronic element is a transistor, the voltage variation may cause malfunction of the transistor. Furthermore, the deterioration of the capacitor lower the protection precision of the electronic elements.

Furthermore, in this case, it is required to provide capacitors 102 whose number correspond to the number of the high side circuit and the low side circuit and the plural kinds of electronic equipment 101. For example, when the air-bag ECU has twenty squibs, capacitors must be provided to both sides of each squib. Therefore, in this case, forty capacitors must be provided. That is, in the electrical and electronic system having the high side circuit and the low side circuits and the plural kinds of electrical equipment, the cost is greatly increased and reduction in size of the ECU is obstructed.

Still furthermore, with respect to ESD protection using only zener diodes, the zener diode directly leaks ESD to the ground, and thus the zener voltage may be varied in accordance with current flowing through the zener diode itself because of the characteristic of the zener diode. That is, when current caused by ESD flows into the zener diode itself, zener voltage is varied, the zener diode is deteriorated, etc., so that the ability of protecting the electronic elements is lowered. Furthermore, as in the case of the capacitor, it is required to provide zener diodes whose number correspond to the number of the high side circuits and the low side circuits and plural kinds of electrical equipment, so that the cost is greatly increased and reduction in size of the ECU is obstructed.

In addition, the high side circuit has less number of passages through which ESD leaks to the ground as compared with the low side circuit. Therefore, it is required to provide a more effective way to leak ESD to the ground in the high side circuit.

SUMMARY OF THE INVENTION

The present invention therefore has an object to provide an electrical and electronic system, in which electronic elements can be effectively protected from ESD entering from the external side.

According to one aspect of the present invention, an electrical and electronic system comprises an ECU and an electric equipment disposed at an outside of the ECU. The ECU includes therein a power supply circuit, a power supply line, an electronic element, a noise protection line, a switching element and a voltage detector. The power supply line extends from the power supply circuit, and the electrical equipment is connected between the ground and the power supply line. The electronic element is connected to the power supply line. The noise protection line is connected to an element line at one end thereof and to the ground at the other end thereof. The element line is a part of the power supply line and connects the electrical equipment and the electronic element. The switching element has a first terminal connected to a side of the element line and a second terminal connected to a side of the ground so that the switching element is connected to the noise protection line in series. The voltage detector detects a voltage value of switching element, and turns on the switching element when the detected voltage value reaches a predetermined value.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
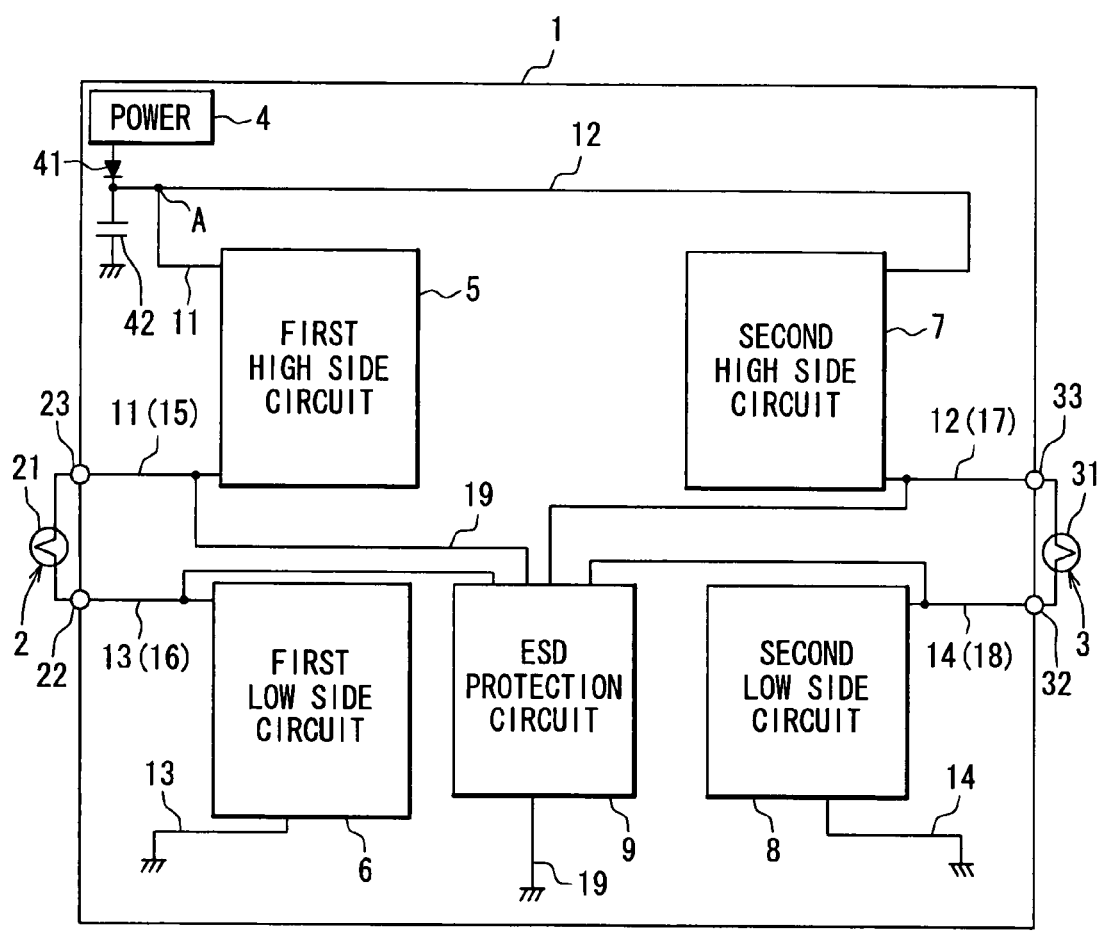
FIG. 1 is a block diagram showing an electrical and electronic system according to a first embodiment of the present invention.

An electrical and electronic system according to a first embodiment includes, as shown in FIG. 1, an air-bag electronic control unit (ECU) 1, a first squib 2 and a second squib 3. The air-bag ECU 1 is for controlling permission/prohibition of activation of a bag body in an air-bag device for a vehicle. The air-bag ECU 1 is equipped therein with a direct current power supply circuit 4, a diode 41, a common capacitor 42, a high-potential side circuit portion (first high side circuit) 5, a low-potential side circuit portion (first low side circuit) 6, a second high side circuit 7, a second low side circuit 8, and a common ESD protection circuit 9.

The first squib 2 and the second squib 3, which are first electrical equipment and second electrical equipment, respectively, are ignition devices for air-bags. They are supplied with power from the power supply circuit 4 to be actuated. Each of the squibs 2 and 3 is provided to the outside of the air-bag ECU 1, and has a squib main body 21, 31, a low side terminal 22, 32, and a high side terminal 23, 33. The squib main body 21 (31) and the low side terminal 22 (32) or the high side terminal 23 (33) may be connected to each other by a wire harness or the like (not shown).

Here, the basic line (wire) in the air-bag ECU 1 will be described.

A first power supply line 11 connects the power supply circuit 4 and the high side terminal 23 of the squib 2 to each other, and a second power supply line 12 connects a connection point A described later and the high side terminal 33 of the second squib 3 to each other. A first ground line 13 connects the low side terminal 22 of the first squib 2 to the ground, and a second ground line 14 connects the low side terminal 32 of the second squib 3 to the ground.

That is, with respect to the first squib 2, the low side terminal 22 is connected to the first ground line 13, and the high side terminal 23 is connected to the first power supply line 11. Furthermore, with respect to the second squib 3, the low side terminal 32 is connected to the second ground line 14, and the high side terminal 33 is connected to the second power supply line 12.

The first high side circuit 5 is disposed on the first power supply line 11, and the first low side circuit 6 is disposed on the first ground line 13. The second high side circuit 7 is disposed on the second power supply line 12, and the second low side circuit 8 is disposed on the second ground line 14. The common ESD protection circuit 9 is disposed on the noise protecting line 19 described later.

The connection point A is provided on the first power supply line 11 between the power supply circuit 4 and the first high side circuit 5. That is, the first power supply line 11 has the connection point A between the power supply circuit 4 and the first high side circuit 5.

The diode 41 is connected to the first power supply line 11 in series so that the anode thereof is connected to the power supply circuit 4 and the cathode thereof is connected to the connection point A. One terminal of a common capacitor 42 is connected between the power supply circuit 4 and the connection point A on the first power supply line 11, and the other terminal thereof is connected to the ground.

Figure 2:
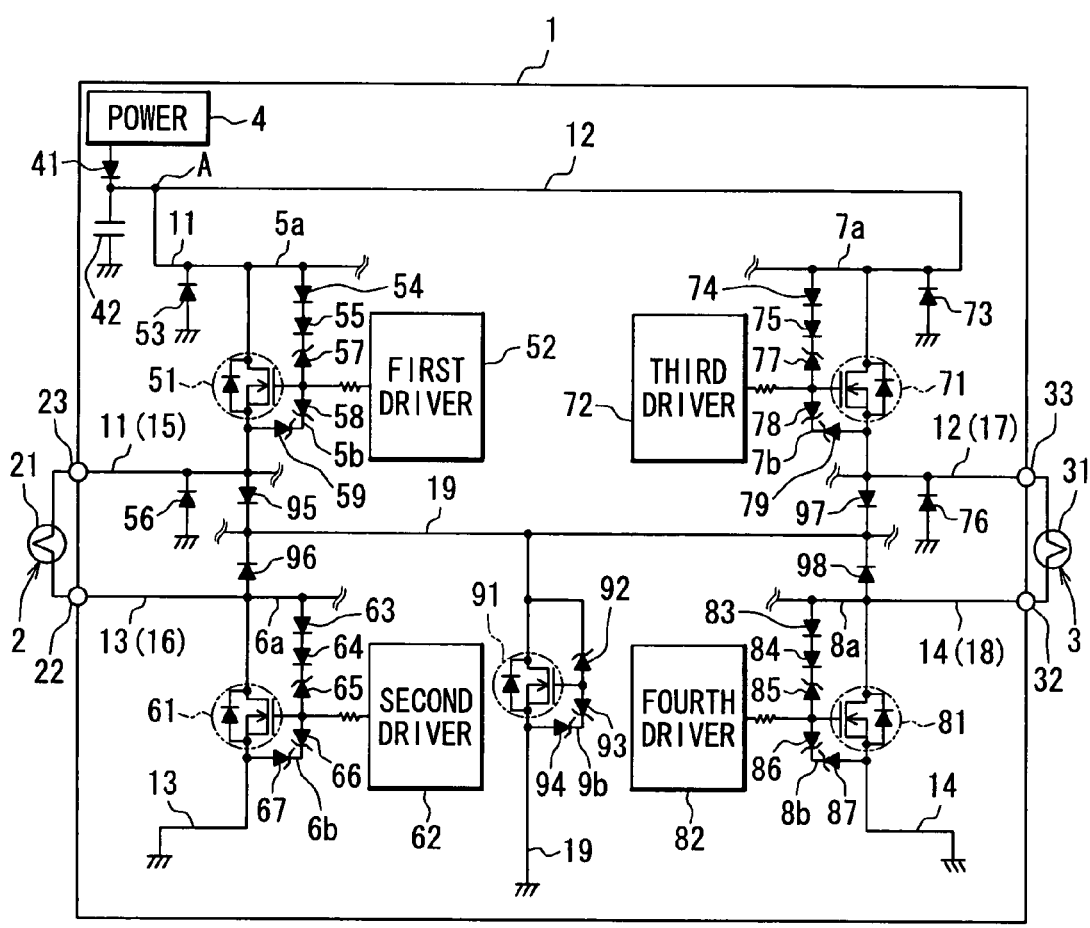
FIG. 2 is a circuit diagram showing the electrical and electronic system of the first embodiment.

Next, the first high side circuit 5, the first low side circuit 6, the second high side circuit 7, the second low side circuit 8 and the common ESD protection circuit 9 will be described in detail with reference to FIG. 2.

The first high side circuit 5 is equipped with an n-channel MOS transistor 51 as a first electronic element 51, a first driver circuit 52, diodes 53 to 56 and zener diodes 57 to 59. The first driver circuit 52 controls the ON/OFF operation of the first electronic element 51.

The first electronic element 51 is disposed so that the drain thereof is connected to the power supply circuit 4 through the diode 41, the source thereof is connected to the high side terminal 23 of the first squib 2 and the gate thereof is connected to the first driver circuit 52. That is, the first electronic element 51 is connected to the first power supply line 11 in series.

Here, a wire for connecting the source of the first electronic element 51 and the high side terminal 23 of the first squib 2 to each other is referred to as a first element line 15. The first electronic element 51 is connected to the first power supply line 11 in series. Therefore, the first element line 15 is a part of the first power supply line 11 (from the source of the first electronic element 51 to the high side terminal 23 of the first squib 2).

The diode 53 is disposed so that the cathode thereof is connected between the power supply circuit 4 and the drain of the first electronic element 51 on the first power supply line 11, and the anode thereof is connected to the ground. The diode 56 is disposed so that the anode thereof is connected to the ground, and the cathode thereof is connected to the first element line 15. Here, a wire for connecting the drain and gate of the first electronic element 51 is referred to as a first drain-gate line 5a.

The diodes 54, 55 and the zener diode 57 are connected to the first drain-gate line 5a in series. That is, the anode of the diode 54 is connected to the drain of the first electronic element 51, and the cathode of the diode 54 is connected to the anode of the diode 55. The cathode of the diode 55 is connected to the cathode of the zener diode 57, and the anode of the zener diode 57 is connected to the gate of the first electronic element 51.

A wire for connecting the gate and source of the first electronic element 51 is referred to as a first gate-source line 5b. The zener diodes 58, 59 are connected to the first gate-source line 5b in series. That is, the anode of the zener diode 58 is connected to the gate of the first electronic element 51, and the cathode of the zener diode 58 is connected to the cathode of the zener diode 59. The anode of the zener diode 59 is connected to the source of the first electronic element 51.

Next, the details of the first low side circuit 6 will be described.

The first low side circuit 6 is equipped with an n-channel MOS transistor 61 as a second electronic element 61, a second driver circuit 62, diodes 63, 64, an zener diode 65, and zener diodes 66, 67. The second driver circuit 62 controls the ON/OFF operation of the second electronic element 61.

The second electronic element 61 is disposed so that the drain thereof is connected to the low side terminal 22 of the first squib 2, the source thereof is connected to the ground and the gate thereof is connected to the second driver circuit 62. That is, the second electronic element 61 is connected to the first ground line 13 in series. Here, a wire for connecting the drain of the second electronic element 61 and the low side terminal 22 of the first squib 2 to each other is referred to as a second element line 16. The second electronic element 61 is connected to the first ground line 13 in series. Therefore, the second element line 16 is a part of the first ground line 13 (from the drain of the second electronic element 61 to the low side terminal 22 of the first squib 2).

Here, a wire for connecting the drain and gate of the second electronic element 61 is referred to as a second drain-gate line 6a. The diodes 63, 64 and the zener diode 65 are connected to the second drain-gate line 6a in series.

The diodes 63, 64 are connected in series so that the cathodes thereof are located at the gate side of the second electronic element 61 on the second drain-gate line 6a. The zener diode 65 is connected in series in the opposite direction to the diode 64 which is located to be nearest to the gate side of the second electronic element 61.

That is, the anode of the diode 63 is connected to the drain of the second electronic element 61, and the cathode of the diode 63 is connected to the anode of the diode 64. The cathode of the diode 64 is connected to the cathode of the zener diode 65, and the anode of the zener diode 65 is connected to the gate of the second electronic element 61.

A wire for connecting the gate and source of the second electronic element 61 is referred to as a second gate-source line 6b. The zener diodes 66, 67 are connected to the second gate-source line 6b in series. That is, the anode of the zener diode 66 is connected to the gate of the second electronic element 61, and the cathode of the zener diode 66 is connected to the cathode of the zener diode 67. The anode of the zener diode 67 is connected to the source of the second electronic element 61.

Next, the details of the second high side circuit 7 will be described.

The second high side circuit 7 is equipped with an n-channel MOS transistor 71 as a third electronic element 71, a third driver circuit 72, diodes 73 to 76 and zener diodes 77 to 79. The third driver circuit 72 controls the ON/OFF operation of the third electronic element 71.

The third electronic element 71 is disposed so that the drain is connected to the power supply circuit 4 through the connection point A and the diode 41, the source thereof is connected to the high side terminal 33 of the second squib 3 and the gate thereof is connected to the third driver circuit 72. That is, the third electronic element 71 is connected to the second power supply line 12 in series.

Here, a wire for connecting the source of the third electronic element 71 and the high side terminal 33 of the second squib 3 is referred to as a third element line 17. The third electronic element 71 is connected to the second power supply line 12 in series. Therefore, the third element line 17 is a part of the second power supply line 12 (from the source of the third electronic element 71 to the high side terminal 33 of the second squib 3).

The diode 73 is disposed so that the cathode thereof is connected between the connection point A and the third electronic element 71 on the second power supply line 12 and the anode thereof is connected to the ground. The diode 76 is disposed so that the anode thereof is connected to the ground and the cathode thereof is connected to the third element line 17. Here, a wire for connecting the drain and gate of the third electronic element 71 is referred to as a third drain-gate line 7a.

The diodes 74, 75 and the zener diode 77 are connected to the third drain-gate line 7a in series. That is, the anode of the diode 74 is connected to the drain of the third electronic element 71, and the cathode of the diode 74 is connected to the anode of the diode 75. The cathode of the diode 75 is connected to the cathode of the zener diode 77, and the anode of the zener diode 77 is connected to the gate of the third electronic element 71.

Furthermore, a wire for connecting the gate and source of the third electronic element 71 is referred to as a third gate-source line 7b. The zener diodes 78, 79 are connected to the third gate-source line 7b in series. That is, the anode of the zener diode 78 is connected to the gate of the third electronic element 71, and the cathode of the zener diode 78 is connected to the cathode of the zener diode 79. The anode of the zener diode 79 is connected to the source of the third electronic element 71.

Next, the details of the second low side circuit 8 will be described.

The second low side circuit 8 is equipped with an n-channel MOS transistor 81 as a fourth electronic element 81, a fourth driver circuit 82, diodes 83, 84, a zener diode 85, and zener diodes 86, 87. The fourth driver circuit 82 controls the ON/OFF operation of the fourth electronic element 81.

The fourth electronic element 81 is disposed so that the drain thereof is connected to the low side terminal 32 of the second squib 3, the source thereof is connected to the ground and the gate thereof is connected to the fourth driver circuit 82. That is, the fourth electronic element 81 is connected to the second ground line 14 in series.

Here, a wire for connecting the drain of the fourth electronic element 81 and the low side terminal 32 of the second squib 3 is referred to as a fourth element line 18. In the first embodiment, the fourth electronic element 81 is connected to the second ground line 14 in series. Therefore, the fourth element line 18 is a part of the second ground line 14 (from the drain of the fourth electronic element 81 to the low side terminal 32 of the second squib 3).

Here, a wire for connecting the drain and gate of the fourth electronic element 81 is referred to as a fourth drain-gate line 8a. The diodes 83, 84 and the zener diode 85 are connected to the fourth drain-gate line 8a in series.

The diodes 83, 84 are connected in series so that the cathodes thereof are located at the gate side of the fourth electronic element 81 on the fourth drain gate line 8a. The zener diode 85 is connected in series in the opposite direction to the diode 84 which is located to be nearest to the gate side of the fourth electronic element 81.

That is, the anode of the diode 83 is connected to the drain of the fourth electronic element 81, and the cathode of the diode 83 is connected to the anode of the diode 84. The cathode of the diode 84 is connected to the cathode of the zener diode 85, and the anode of the zener diode 85 is connected to the gate of the fourth electronic element 81.

A wire for connecting the gate and source of the fourth electronic element 81 is referred to as a fourth gate-source line 8b. The zener diodes 86, 87 are connected to the fourth gate source line 8b in series. That is, the anode of the zener diode 86 is connected to the gate of the fourth electronic element 81, and the cathode of the zener diode 86 is connected to the cathode of the zener diode 87. The anode of the zener diode 87 is connected to the source of the fourth electronic element 81.

Next, the details of the common ESD protection circuit 9 will be described.

The common ESD protection circuit 9 is equipped with an n-channel MOS transistor 91 as a switching element 91, zener diodes 92 to 94, a first diode 95, a second diode 96, a third diode 97 and a fourth diode 98. Here, a wire which is connected to the first element line 15 at one end thereof and to the ground at the other end thereof is referred to as a noise protection line 19.

With respect to the switching element 91, on the noise protection line 19, the drain thereof (first terminal) is connected to the first element line 15 side and the source thereof (second terminal) is connected to the ground side. That is, the switching element 91 is connected to the noise protection line 19 in series.

With respect to the zener diode 92 which operates as a voltage detector, the anode thereof is connected to the gate of the switching element 91, and the cathode thereof is connected to the drain of the switching element 91. That is, the gate of the switching element 91 is connected to the anode of the zener diode 92.

Here, a wire for connecting the gate and source of the switching element 91 is referred to as a fifth gate source line 9b. The zener diodes 93, 94 are connected to the fifth gate-source line 9b in series. That is, the anode of the zener diode 93 is connected to the gate of the switching element 91, and the cathode of the zener diode 93 is connected to the cathode of the zener diode 94. The anode of the zener diode 94 is connected to the source of the switching element 91.

The first diode 95 is disposed so that on the noise protection line 19, the anode thereof is connected to the first element line 15 and the cathode thereof is connected to the drain of the switching element 91. The second diode 96 is disposed so that the anode thereof is connected to the second element line 16, and the cathode thereof is connected to the drain of the switching element 91. The third diode 97 is disposed so that the anode thereof is connected to the third element line 17, and the cathode thereof is connected to the drain of the switching element 91. The fourth diode 98 is disposed so that the anode thereof is connected to the fourth element line 18 and the cathode thereof is connected to the drain of the switching element 91.

The cathodes of the second to fourth diodes 96 to 98 are connected to the drain of the switching element 91 through parts of the noise protection line 19. However, they may be directly connected to the drain of the switching element 91.

Furthermore, the zener diodes being used have the same zener voltage. This zener voltage is larger than the maximum voltage value output from the power supply circuit 4 and smaller than the withstanding voltage value of each electronic element.

Here, a plurality of additional circuits, each of which is equipped with the second power supply line 12 extending from the connection point A, the second squib 3, the third electronic element 71, the third diode 97 and the second ground line 14, may be additionally equipped to the air-bag ECU 1.

Furthermore, a circuit having the fourth electronic element 81 and the fourth diode 98 may be provided to one or more of the plurality of the additional circuits, which are similar to the second high side circuit 7. That is, the electrical and electronic system may be equipped with a plurality of second high side circuits and second low side circuits.

Next, the operation of the electrical and electronic system according to the first embodiment will be described.

The electrical and electronic system controls permission/prohibition of development of the bag body in the air-bag device for a vehicle. The first squib 2 and the second squib 3 connected to the air-bag ECU 1 are supplied with power from the power supply circuit 4, thereby developing the bag body of the air-bag device. For example, the first squib 2 is operated when both the first driver circuit 52 and the second driver circuit 62 output ON signals. That is, when both the first electronic element 51 and the second electronic element 61 are turned on with those ON signals, the power supply circuit 4 is conducted to the ground through the first squib 2. Accordingly, the first squib 2 is supplied with electric power from the power supply circuit 4 to develop the bag body of the air-bag device.

First, when ESD enters into the first element line 15 through the high side terminal 23 of the first squib 2, ESD passes through the noise protection line 19 and the first diode 95 and then reaches the drain of the switching element 91. At the same time, the zener diode 92 is clamped by ESD, and the switching element 91 is turned on. Accordingly, the noise protection line 19 is conducted to the ground, and ESD leaks to the ground.

That is, the zener diode 92 detects the voltage value of the drain of the switching element 91, and turns on the switching element 91 when the detected voltage value is equal to or larger than a predetermined value, i.e., zener voltage of the zener diode 92.

The zener voltage of the zener diode 92 is set to be smaller than the withstanding voltage values of the respective electronic elements 51, 61, 71, 81. Therefore, ESD entering into the first element line 15 clamps the zener diode 92 before it reaches the withstanding voltage value of the first electronic element 51, and leaks to the ground through the noise protection line 19. That is, the first electronic element 51 is not broken by ESD.

Furthermore, ESD leaks to the ground through the switching element 91, and thus the zener voltage of the zener diode 92 is stabilized without being varied. That is, the zener voltage of the zener diode 92 is hardly affected by ESD. Accordingly, the electrical and electronic system can protect the electronic elements from ESD with high precision.

When ESD enters into the second element line 16 through the low side terminal 22 of the first squib 2, ESD reaches the drain of the switching element 91 through the second diode 96. At the same time, the zener diode 92 is clamped by ESD, and the switching element 91 is turned on. Accordingly, ESD leaks to the ground through the second diode 96 and the switching element 91.

Here, the second element line 16 is connected to the drain of the switching element 91 through the second diode 96. Furthermore, the second element line 16 is connected to the second drain-gate line 6a. The two diodes 63 and 64 and the zener diode 65 are connected to the second drain gate line 6a. That is, ESD entering into the second element line 16 is also applied to the second drain-gate line 6a. However, before the zener diode 65 is clamped, the zener diode 92 is clamped, so that the second electronic element 61 is prevented from being turned on, i.e., from malfunctioning.

Furthermore, the first embodiment has also the same operation and advantage as described above in a case where ESD enters into the third element line 17 through the high side terminal 33 of the second squib 3 and a case where ESD enters into the fourth element line 18 through the low side terminal 32 of the second squib 3. That is, ESD can be made to leak through the switching element 91 to the ground even when ESD enters into any of the element lines 15 to 18. This operation and advantage will be provided even when plural second high and low circuits are provided.

In the first embodiment, the electronic elements 51, 61, 71, 81 can be protected from ESD even when the air-bag ECU 1 has plural squibs 2, 3. Furthermore, the switching element 91 and the zener diode 92 common to the respective electronic elements 51, 61, 71, 81 are provided as common ESD protection means, so that the cost can be reduced and the air-bag ECU 1 can be reduced in size.

Next, the operation of each element used in the first embodiment will be described.

The diode 56 in the first high side circuit 5 operates to make negative noise (negative ESD or the like) on the first element line 15 leak to the ground. The diode 76 in the second high side circuit 7 operates to make negative noise on the third element line 17 leak to the ground. Negative noise on the second element line 16 and the fourth element line 18 is made to leak to the ground by parasite diodes of the respective electronic elements 61, 81 (MOS transistor).

The common capacitor 42 makes alternating noise from the power supply circuit 4 leak to the ground. The diodes 53, 73 make negative noise from the power supply circuit 4 to each of the electronic elements 51, 71 leak to the ground. These are effective as a countermeasure to radio noise output from the air-bag ECU 1 to the outside. Here, the radio noise output from the low side is suppressed by the parasitic capacity of each of the electronic elements 61, 81 (MOS transistors).

On each gate-source line of each electronic element 51, 61, 71, 81, the zener diodes 58, 59 66, 67, 78, 79, 86, 87 are connected in series and in oppositely-biased manner. Therefore, each electronic element is protected from noise (ESD or the like) from the source side of each electronic element. That is, each gate-source line and each drain-gate line are provided to protect each electronic element from being broken by ESD.

In the air-bag ECU 1, the first high side circuit 5, the first low side circuit 6, the second high side circuit 7, the second low side circuit 8 and the common ESD protection circuit 9 may be installed in one integrated circuit (IC) or an application specific integrated circuit (ASIC).

The electrical and electronic system of the first embodiment has the same operation and advantage, even when each of the first electronic element 51 and the third electronic element 71 is a p-channel MOS transistor. In this case, the first electronic element 51 is disposed so that the source thereof is connected to the power supply circuit 4, the drain thereof is connected to the high side terminal 23 of the first squib 2 and the gate thereof is connected to the first driver circuit 52. The third electronic element 71 is disposed so that the source thereof is connected to the power supply source 4, the drain thereof is connected to the high side terminal 33 of the second squib 3 and the gate thereof is connected to the third driver circuit 72.

Second Embodiment

Figure 3:
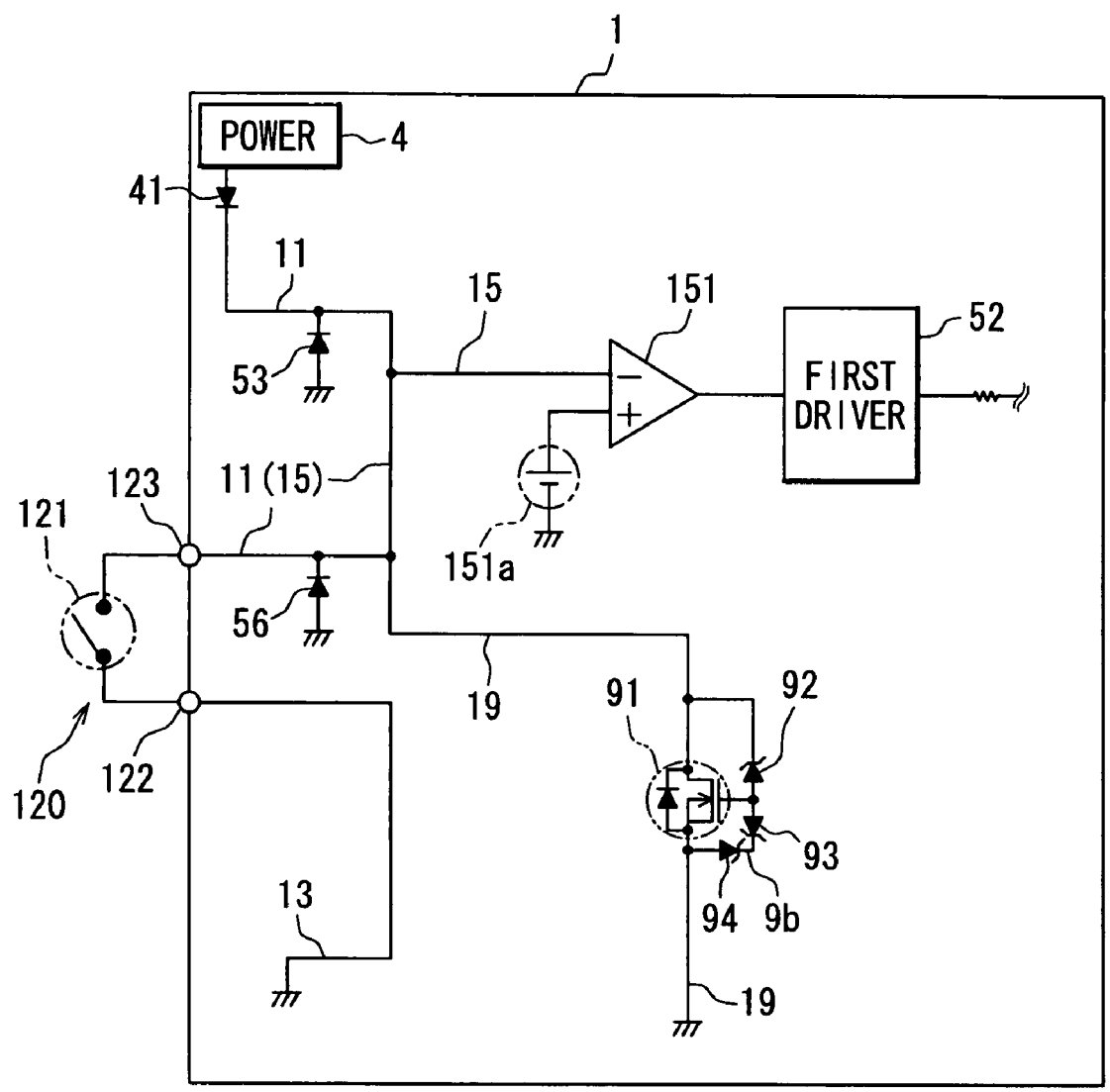
FIG. 3 is a circuit diagram showing an electrical and electronic system according to a second embodiment of the present invention.
Figure 4:
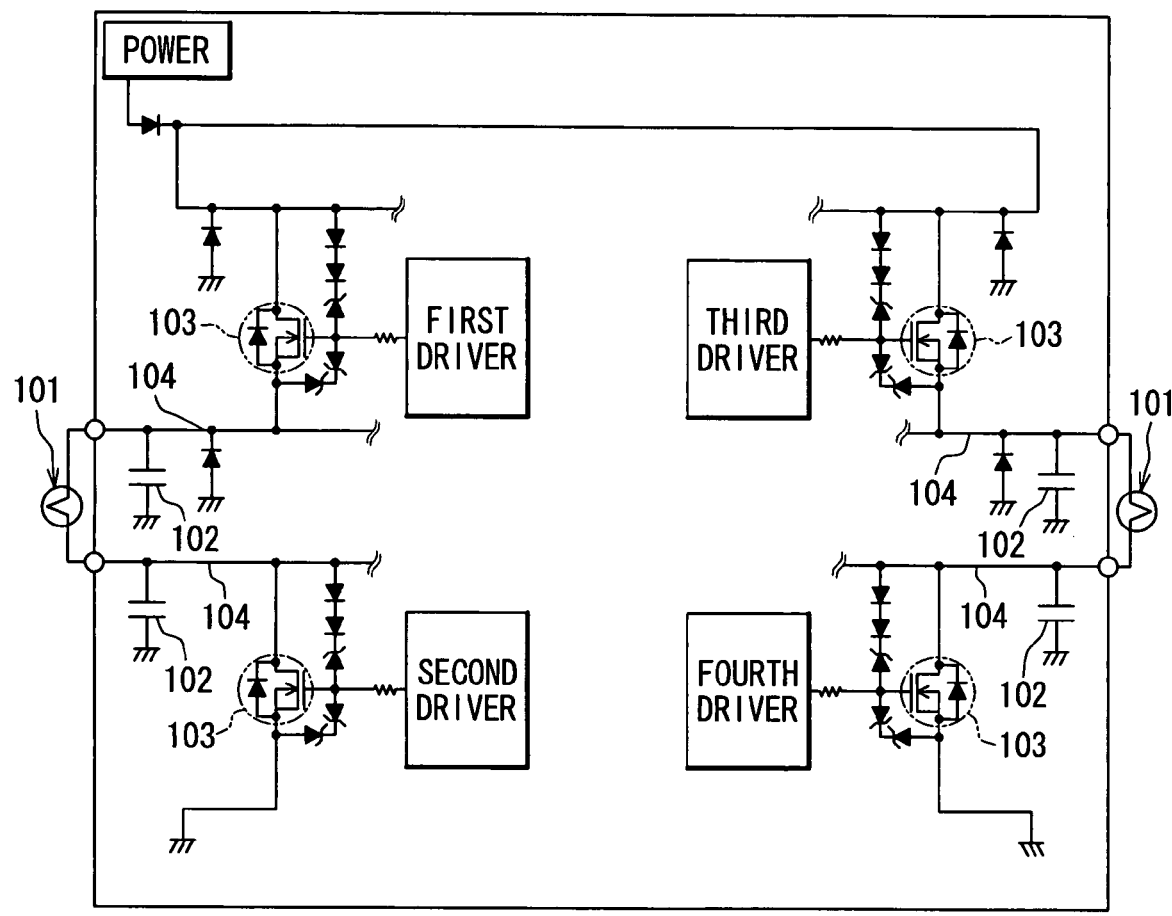
FIG. 4 is a circuit diagram showing a conventional electrical and electronic system.

An electrical and electronic system according to a second embodiment will be described with reference to FIG. 3, in which elements having the same functions as the first embodiment are represented by the same reference numerals.

This electrical and electronic system is used to supply predetermined information to the first driver circuit 52 in the air-bag ECU 1. The predetermined information is information as to whether an occupant sits on a seat or not in a vehicle, or information as to whether an occupant fasten his/her seatbelt, for example.

Specifically, a comparator 151, which is equipped as an electronic element and may be an operational amplifier, is not connected to the first power supply line 11 in series. That is, the comparator 151 is disposed in the air-bag ECU 1, and the inverting terminal (−) thereof (input terminal) is connected to the first power supply line 11. Non-inverting terminal (+) of the comparator 151 is connected to a reference voltage source 151a. The reference voltage source 151a outputs a reference voltage to be compared by the comparator 151. The negative pole of the reference voltage source 151a is connected to the ground, and the positive pole thereof is connected to the non-inverting terminal (+) of the comparator 151. The output terminal of the comparator 151 is connected to the first driver circuit 52.

A switch 120 is disposed as the first electrical equipment. The switch 120 is provided at the outside of the air-bag ECU 1, and it has a switch main body 121 and two terminals 122 and 123. The switch main body 121 and the terminal 122 or the terminal 123 may be connected to each other by a wire harness or the like (not shown).

That is, the switch 120 is disposed so that the terminal 122 thereof is connected to the ground and the terminal 123 thereof is connected to the first power supply line 11. The switch 120 may be a sensor such as a load sensor or the like.

With this construction, the comparator 151 compares the input voltage from the power supply circuit 4 with the input voltage from the reference voltage source 151a. When the input voltage of the power supply circuit 4 is larger, the comparator 151 outputs a low level signal. When the input voltage of the reference voltage source 151a is larger, it outputs a high level signal. That is, the comparator 151 outputs the low level signal to the first driver circuit 52 when the switch 120 is OFF (under the non-conduction to the ground), and outputs the high level signal to the first driver circuit 52 when the switch 120 is ON (under the conduction to the ground).

The switch 120 is an occupant detecting sensor which is disposed at a seat of the vehicle, for example, turned on when an occupant sits on the seat and turned off when no occupant sits on the seat. In this case, the comparator 151 outputs any one of the high level signal and the low level signal in accordance with whether an occupant sits on the seat or not. This switch 120 may be disposed so that it is turned on by a load imposed on the seat when the occupant sits on the seat. The switch 120 may be disposed in the neighborhood of a buckle insert port of a seatbelt. The switch 120 is turned on when the seatbelt is inserted into the buckle insert port, and turned off when it is detached therefrom. In this case, the comparator 151 outputs any one of the high level signal and the low level signal in accordance with whether the occupant fastens his/her seatbelt or not.

That is, on the basis of the ON/OFF of the switch 120, the output of the comparator 151 is set to be high or low. The information of ON/OFF of the switch 120 is transmitted to the first driver circuit 52, whereby the first driver circuit 52 can acquire the sitting information of the occupant or the fastening information of the seatbelt. The first driver circuit 52 can reflect these information to the control of the first electronic element 51. That is, the control precision of the development of the air-bag can be enhanced.

As in the case of the first embodiment, in the electrical and electronic system of the second embodiment, the noise protection line 19 is connected to the first element line 15. The first element line 15 contains a part of the first power supply line 11, and it extends from the terminal 123 of the switch 120 to the inverting terminal (−) of the comparator 151. Furthermore, the zener diode 92 and the switching element 91 have the same functions as the first embodiment.

Accordingly, even when ESD enters into the air-bag ECU 1 through the terminal 123 of the switch 120, the ESD concerned is made to leak to the ground through the noise protection line 19. Accordingly, the comparator 151 is protected from being broken by ESD entering from the external side. Furthermore, as in the case of the first embodiment, the zener voltage of the zener diode 92 is hardly affected by ESD, and thus the electrical and electronic system of the second embodiment can protect the comparator 151 from ESD properly.

The output of the comparator 151 may be transmitted to a device (for example, the second driver circuit 62 or the like) other than the first driver circuit 52. Furthermore, the output of the comparator 151 may be simultaneously transmitted to plural driver circuits, etc.

The electrical and electronic system of the second embodiment can be mounted in the electrical and electronic system of the first embodiment. In this case, the ESD countermeasure can be taken by the same common ESD protection circuit 9. Furthermore, as in the case of the first embodiment, one common ESD protection circuit 9 may be disposed for plural high side circuits or low side circuits.

The comparator 151 may be replaced by an operational amplifier. In this case, the same operation as the second embodiment can be performed, and the same advantage can be achieved.

What is claimed is:

1. An electrical and electronic system comprising:
   an ECU;
   a power supply circuit that is disposed in the ECU;
   a first power supply line that is disposed in the ECU and extends from the power supply circuit;
   first electrical equipment that is disposed at an outside of the ECU, and has one terminal connected to the ground and the other terminal connected to the first power supply line;
   a first electronic element that is disposed in the ECU and connected to the first power supply line;
   a noise protection line that is disposed in the ECU and connected to a first element line at one end thereof and to the ground at the other end thereof, the first element line being a part of the first power supply line and connecting the other terminal of the first electrical equipment and the first electronic element;
   a switching element that is disposed in the ECU and has a first terminal connected to a side of the first element line and a second terminal connected to a side of the ground so that the switching element is connected to the noise protection line in series; and
   a voltage detector that is disposed in the ECU, detects a voltage value of the first terminal of the switching element and turns on the switching element when the detected voltage value reaches a predetermined value.

2. The electrical and electronic system according to claim 1, wherein:
   the first electronic element is one of a comparator or an operational amplifier having an input terminal connected to the first power supply line.

3. The electrical and electronic system according to claim 1, wherein:
   the switching element is an n-channel MOS transistor having a drain, source and gate connected to the first terminal, the second terminal and the voltage detector, respectively.

4. The electrical and electronic system according to claim 1, further comprising:
   a first driver circuit that is disposed in the ECU and controls ON/OFF of the first electronic element,
   wherein the first electronic element is an n-channel MOS transistor connected to the first power supply line in series, and having a drain, source and gate connected to the power supply circuit, the other terminal of the first electrical equipment and the first driver circuit, respectively.

5. The electrical and electronic system according to claim 1, further comprising:
   a first driver circuit that is disposed in the ECU and controls ON/OFF of the first electronic element,
   wherein the first electronic element is a p-channel MOS transistor connected to the first power supply line in series, and having a source, drain and gate connected to the power supply circuit, the other terminal of the first electrical equipment and the first driver circuit, respectively.

6. The electrical and electronic system according to claim 1, wherein:
   the voltage detector is a zener diode.

7. The electrical and electronic system according to claim 1, further comprising:
   a first diode that is disposed in the ECU and has an anode connected to the first element line and a cathode connected to the first terminal of the switching element on the noise protection line;
   a first ground line that is disposed in the ECU and extends between the one terminal of the first electrical equipment and the ground;
   a second electronic element that is disposed in the ECU and connected in series to the first ground line; and
   a second diode that is disposed in the ECU, and has an anode connected to a second element line for connecting the one terminal of the first electrical equipment and the second electronic element and a cathode connected to the first terminal of the switching element.

8. The electrical and electronic system according to claim 7, further comprising:
   a second driver circuit that is disposed in the ECU and controls ON/OFF of the second electronic element,
   wherein the second electronic element is an n-channel MOS transistor connected to the first ground line in series, and having a drain connected to the one terminal of the first electrical equipment and an anode of the second diode, a source connected to the ground and a gate connected to the second driver circuit.

9. The electrical and electronic system according to claim 8, further comprising:
   a plurality of diodes that is connected to a drain-gate line for connecting the drain and gate of the second electronic element in series so that cathodes thereof are located at a gate side; and
   a zener diode that is connected in series between the cathode of the diode located to be nearest to the gate side and the gate in the opposite direction to the diode concerned.

10. The electrical and electronic system according to claim 7, further comprising:
    a second power supply line that is disposed in the ECU and extends in parallel to the first power line;
    second electrical equipment that is disposed at an outside of the ECU and has one terminal connected to the ground and the other terminal connected to the second power supply line;

a third electronic element that is disposed in the ECU and connected to the second power supply line in series; and a third diode that is disposed in the ECU and has an anode connected to a third element line for connecting the other terminal of the second electrical equipment and the third electronic element, and a cathode connected to the first terminal of the switching element, wherein the second power supply line is connected to the first power supply line at a connection point between the power supply circuit and the first electronic element.

11. The electrical and electronic system according to claim 10, further comprising:

a third driver circuit that is disposed in the ECU and controls ON/OFF of the third electronic element, wherein the third electronic element is an n-channel MOS transistor connected to the second power supply line in series, and having a drain, source and gate connected to the power supply circuit, the other terminal of the second electrical equipment and the third driver circuit, respectively.

12. The electrical and electronic system according to claim 10, further comprising:

a third driver circuit that is disposed in the ECU and controls ON/OFF of the third electronic element, wherein the third electronic element is a p-channel MOS transistor connected to the second power supply line in series, and having a source, drain and gate thereof connected to the power supply circuit, the other terminal of the second electrical equipment and the third driver circuit, respectively.

13. The electrical and electronic system according to claim 10, further comprising:

a capacitor that is disposed in the ECU, and has one end connected between the power supply circuit and the connection point on the first power supply line and the other end connected to the ground.

14. The electrical and electronic system according to claim 10, further comprising:

a second ground line that is disposed in the ECU and extends between the one terminal of the second electrical equipment and the ground;

a fourth electronic element that is disposed in the ECU and connected in series to the second ground line; and a fourth diode that is disposed in the ECU and has an anode connected to a fourth element line for connecting the one terminal of the second electrical equipment and the fourth electronic element and a cathode connected to the first terminal of the switching element.

15. The electrical and electronic system according to claim 14, further comprising:

a fourth driver circuit that is disposed in the ECU and controls ON/OFF of the fourth electronic element, wherein the fourth electronic element is an n-channel MOS transistor connected to the second ground line in series, and having a drain connected to the one terminal of the second electrical equipment and the anode of the fourth diode, a source connected to the ground and a gate connected to the fourth driver circuit.

16. The electrical and electronic system according to claim 15, further comprising:

two or more diodes that are connected to a drain-gate line for connecting the drain and the gate of the fourth electronic element in series and have cathodes located at a gate side; and a zener diode that is connected in series between the cathode of the diode located to be nearest to the gate side and the gate of the fourth electronic element in the opposite direction to the diodes.

17. The electrical and electronic system according to claim 1, further comprising:

a first diode that is disposed in the ECU and has an anode connected to the first element line and a cathode connected to the first terminal of the switching element on the noise protection line;

a second power supply line disposed in the ECU and extends in parallel to the first power supply line;

a second electrical equipment that is disposed at an outside of the ECU and has one terminal connected to the ground and the other terminal connected to the second power supply line;

a third electronic element that is disposed in the ECU and connected to the second power supply line in series; and a third diode that is disposed in the ECU and has an anode connected to a third element line for connecting the other terminal of the second electrical equipment and the third electronic element, and a cathode connected to the first terminal of the switching element, wherein the second power supply line is connected to the first power supply line at a connection point between the power supply circuit and the first electronic element.

18. The electrical and electronic system according to claim 17, further comprising:

a capacitor that is disposed in the ECU and has one end connected between the power supply circuit and the connection point on the first power supply line and the other end connected to the ground.

19. An electrical and electronic system comprising:

a power supply circuit;

first electrical equipment that is connected between the power supply circuit and a ground;

a first high side circuit connected between the power supply circuit and the first electrical equipment;

a first low side circuit connected between the first electrical equipment and the ground;

second electrical equipment that is connected between the power supply circuit and the ground;

a second high side circuit connected between the power supply circuit and the first electrical equipment;

a second low side circuit connected between the first electrical equipment and the ground;

a protection circuit that is connected to two equipment terminals of the first electrical equipment and to two equipment terminals of the second electrical equipment and includes a switching element which is turned on to pass a noise entering into any of the equipment terminals to the ground therethrough when the noise exceeds a predetermined value.

20. The electrical and electronic system according to claim 19, wherein:

the protection circuit further includes a zener diode and diodes that connect all the equipment terminals to the zener diode, respectively, to apply the noise to the zener diode and the switching element, wherein the zener diode breaks down at the predetermined value of the noise and turns on the switching element.

* * * * *